United States Patent Office 2,802,730
Patented Aug. 13, 1957

2,802,730

PROCESS FOR THE REDUCTION OF CARBON CONTENT OF FERROALLOYS

Alan R. Fraser and Thomas J. Slattery, Sault Ste. Marie, Ontario, Canada, assignors to Chromium Mining & Smelting Corporation, Limited, Sault Ste. Marie, Ontario, Canada, a corporation of Ontario No Drawing. Application June 16, 1954,
Serial No. 437,274

3 Claims. (Cl. 75—28)

This invention relates to a process for the production of low carbon ferrochromium from high carbon ferrochromium in the vacuum furnace, wherein the carbon of the high carbon ferrochromium is oxidized, substantially without fusion, by solid oxidizing agent including an oxide of iron.

A principal object of the invention is to provide a process as aforesaid wherein the iron oxide employed for oxidizing the carbon of the high carbon ferrochromium is specially treated and is highly efficient in the performance of its function.

Another object is to produce in accordance with the foregoing process, from a given high carbon ferrochromium, a low carbon ferrochromium having a chromium-to-iron ratio that is as high as possible.

Another object is to provide an improved process of the type in question in which the carbon oxidation reaction proceeds at high velocity to substantial completion.

The foregoing and other aims, objects and advantages of the invention, as may appear hereinafter, are achieved in a process for making low carbon ferrochromium from high carbon ferrochromium and millscale which includes, roasting the millscale under oxidizing conditions at a temperature of from 750° C. to 1500° C. for a time sufficient to burn off any oily and similarly combustible materials contained therein and to oxidize the millscale, intimately mixing the roasted millscale in finely divided form with high carbon ferrochromium, heating the mixture under low subatmospheric pressure for a time and at a temperature sufficient to effect reaction between the carbon of the high carbon ferrochromium and the roasted millscale with the production of oxide of carbon and metallic iron, and continuously removing oxide of carbon from the vicinity of the reactants, said heating step being carried out at a temperature below that at which any substantial fusion occurs.

The common oxides of iron are FeO, $Fe_3O_4$ and $Fe_2O_3$ in which the ratios of oxygen to iron are 1 to 1, 1⅓ to 1 and 1½ to 1, respectively. Millscale has approximately the composition indicated by $Fe_3O_4$ and is usually thought of as having such formula. Millscale is the scale that flakes off of steel billets passing through the rolling mill. It is available in large quantities at reasonable cost. As received, millscale is usually contaminated with oil, grease and similar materials and with particles or pieces of metallic steel. It also contains carbon derived from the steel.

Roasting the millscale in an oxidizing atmosphere burns off the oil and grease and similarly combustible substances that contaminate the millscale as received. The roasting operation also oxidizes some of the carbon of the millscale that is derived from the steel billets. The oil and the like and carbon produce gaseous products of combustion that pass off in the combustion gases from the roaster. Since these materials are reducing in character, the extent to which they are removed from the millscale increases the oxdizing power of the millscale.

Additionally, the roasting operation oxidizes some or a substantial part of the FeO and $Fe_3O_4$, thereby further increasing the oxidizing power of the roasted millscale.

Moreover, the oxidizing power of the millscale is still further enhanced in the roasting operation by partial or complete oxidation of the ferrous metal particles contained in the millscale as received.

If desired, the millscale, as received from the mill, may be freed from metallic particles prior to roasting by separating the metal from the oxide using a gravity or flotation concentration process. It is preferred, however, to comminute the millscale, as by ball-milling, roll-milling or hammer-milling and thereafter to screen the comminuted material. The comminution step forms platelets of the metallic particles and reduces the oxide content of the millscale to a finer state than the platelets of metal. Screening through a screen of suitable size mesh separates the larger metallic platelets from the smaller particles of iron oxide.

However, it is considered desirable first to roast the millscale as received and thereafter to separate the remaining metal fraction from the iron oxide fraction. The roasting operation, as mentioned hereinbefore, at least partially oxidizes the metal particles of the millscale thereby increasing the oxidizing power of the roasted product. Also, roasting makes the material more amenable to comminution, thus facilitating grinding and screening or other process of separating metal from oxide.

Regardless of whether the metal fraction is removed from the millscale before or after the oxidizing roast, the resulting oxide fraction is improved as an oxidizing agent in the process of the invention because of the removal therefrom of the ferrous metal particles which are inert as oxidants and, if present, would dilute the resulting low carbon ferrochromium.

Millscale used in the process of the invention is roasted in a rotary kiln, a Herreshoff roaster or other conventional roasting equipment. A suitable temperature of roast is 1050° C. Higher temperatures up to 1500° C. may be used if sintering and fusion of the kiln product is not objectionable. The preferred range of temperatures is from 900° C. to 1050° C., at which nodulizing or sintering does not take place. However, temperatures as low as 750° C. or lower may be used to advantage in the roasting of the millscale.

Millscale, roasted in accordance with the invention, and either free from or containing ferrous metal particles, is an efficacious oxidizing agent for the carbon of high carbon ferrochromium in the solid state, vacuum furnace process for making low carbon ferrochromium.

High carbon ferrochromium is a ferrous alloy usually containing from 50% to 80% chromium, from 4% to 10% carbon, the balance being substantially all iron except for incidental impurities, including from 2% to 5% silicon and minor percentages of aluminum, magnesium, calcium and the like. Carbon is chiefly present as carbides of chromium and iron, but some of the carbon may be present in solution in the high carbon ferrochromium.

Low carbon ferrochromium may contain up to 1% to 2% carbon, but the more desirable grades contain carbon under 0.1% and may have as little as 0.01% carbon or less; otherwise low carbon ferrochromium is similar in composition to high carbon ferrochromium. In the vacuum furnace process for the production of low carbon ferrochromium from high carbon ferrochromium, finely divided high carbon ferrochromium and finely divided solid oxidizing agent are thoroughly mixed together and the mixture is usually briquetted. The briquettes are reacted in the solid state, i. e. without fusion, in a vacuum furnace at subatmospheric pressure, reaching as low as 100 microns or less, and at temperatures ranging between 1000° C. and 1350° C. with continuous exhaustion of the furnace atmosphere. The solid oxidizing agent—for example iron oxide—reacts with the carbon of the ferrochromium to yield an oxide of carbon, principally CO, and metallic iron, along the lines of the following reactions:

(1) $(FeCr) \cdot C + FeO \rightarrow (FeCr) \cdot Fe + CO$
(2) $4(FeCr) \cdot 4C + Fe_3O_4 \rightarrow 4(FeCr) \cdot 3Fe + 4CO$
(3) $3(FeCr) \cdot 3C + Fe_2O_3 \rightarrow 3(FeCr) \cdot 2Fe + 3CO$ For the production of low carbon ferrochromium, the quantity of roasted millscale required to be used with a particular quantity of high carbon ferrochronium is largely dependent on the carbon content of the latter. However, since there are other materials such as silicon, aluminum and the like in high carbon ferrochromium that are oxidized before or together with the carbon, by the roasted millscale, it is considered expedient to determine experimentally on a small scale the ratio of high carbon ferrochromium to millscale required for given starting materials. Where a very low carbon content is desired in the product of the process, it is desirable to use a slight excess of roasted millscale over that theoretically required to oxidize all of the carbon and concomitantly oxidized components of the high carbon ferrochromium.

It is obvious that the process of the invention may be used for merely reducing the carbon analysis of ferrochromium. For example the carbon content of 7.5% C. high carbon ferrochromium can be lowered to 3.0% to yield a medium carbon ferrochromium by the use of an equivalent quantity of roasted millscale. Or medium carbon ferrochromium having 3.0% C. can be converted to low carbon ferrochromium having 0.01% C.

The process of the invention is described with greater particularity by way of illustration and without limitation in the following example.

Example

Millscale, as received, is roasted in a rotary kiln having a hot zone temperature of 1100° C. The atmosphere of the kiln is maintained in an oxidizing condition by bleeding into the kiln around the burner and adjacent the discharge end of the kiln large volumes of air. Retention time of the millscale in the kiln is about three hours.

The roasted millscale is cooled and ground in a ball mill for one hour. The ground, roasted millscale is air classified to a final product of 85% $-200$ mesh.

The roasted, ground and air classified millscale has the following screen analysis:

| | Percent |
|---|---|
| +80 | 2 |
| +200 | 13 |
| −200 | 85 |
| | 100.0 | and analyzes 69.7% Fe.

The high carbon ferrochromium use has the following screen analysis:

| | Percent |
|---|---|
| +80 | 1 |
| +200 | 9 |
| −200 | 90 |
| | 100.0 | and the following chemical analysis:

| | Percent |
|---|---|
| Cr | 63 |
| Si | 3.5 |
| C | 7.5 |
| Fe | 22.3 |

A mixture of these ingredients and others in the amounts set forth immediately hereinafter is briquetted in a Komarek-Greaves press to form green briquettes of lady finger size:

| | Pounds |
|---|---|
| Roasted millscale | 3,780 |
| High carbon ferrochromium | 7,870 |
| Binder (dextrin) | 275 |
| Water | 75 |
| | 12,000 |

The green briquettes are air dried at room temperature for 24 hours and are thereafter heated in a current of air at a temperature of 500° C. for 12 hours to drive off residual moisture and easily volatilized binder components and to cure the briquettes.

The cured briquettes weighing approximately 12,000 lbs. are introduced into a vacuum furnace and subjected therein to a heating and vacuum treatment in accordance with the following log of operation:

| Time (Hours) | Temperature | Pressure |
|---|---|---|
| 0–16 | 200° C.–1,220° C. | Atm.–50 mm. |
| 17–24 | 1,220° C. ±10° C. | 50 mm.–10 mm. |
| 25–48 | 1,220° C. ±10° C. | 10 mm.–4 mm. |
| 49–72 | 1,220° C. ±10° C. | 4 mm.–0.5 mm. |
| 73–94 | 1,220° C. ±10° C. | 0.5 mm.–0.1 mm. |
| 95–191 | 1,220° C.–500° C. | Furnace Sealed and maintains 1 mm. pressure. |

Upon completion of the vacuum-heat treatment, the residue from the furnace weighs 10,000 lbs. The briquettes discharged from the furnace are of the same shape as the cured briquettes charged to the furnace but are somewhat reduced in size. The low carbon ferrochromium thus produced has the following partial chemical analysis:

| | Percent |
|---|---|
| Cr | 49.5 |
| Fe | 45.0 |
| C | 0.05 |

The present invention is also applicable to the reduction of the carbon content of other ferroalloys such as ferromanganese, ferrovanadium, ferromolybdenum, ferrotungsten and the like, utilizing roasted millscale as oxidant in a vacuum furnace solid state process. Moreover, ternary or higher ferroalloys may be treated in accordance with the present invention.

What is claimed is:

1. The method of decarburizing carbon-bearing ferrochromium which comprises the steps of mixing finely comminuted ferrochromium with comminuted roasted millscale in an amount such that there will be sufficient oxygen to combine with the carbon in the ferrochromium, of charging the mixture to a vacuum furnace, and of heating said mixture under sub-atmospheric pressures for a time and at a temperature sufficient to react substantially all of the carbon in the ferroalloy with the oxygen of the oxide while continuously removing the oxide of carbon from the vicinity of the mixture, whereby the mix agglomerates itself in the vacuum furnace.

2. The method of decarburizing carbon-bearing ferrochromium which comprises the steps of comminuting roasted millscale, separating the metallic particles therein from the oxide particles, mixing finely comminuted ferrochromium with said oxide particles in an amount such that there will be sufficient oxygen to combine with the carbon in the ferrochromium, of charging the mixture to a vacuum furnace, and of heating said mixture under sub-atmospheric pressures for a time and at a temperature sufficient to react substantially all of the carbon in the ferroalloy with the oxygen of the oxide while continuously removing the oxide of carbon from the vicinity of the mixture, whereby the mix agglomerates itself in the vacuum furnace.

3. The method of claim 2 wherein the quantity of roasted millscale added is somewhat in excess of that theoretically necessary to remove all of the carbon.

References Cited in the file of this patent

UNITED STATES PATENTS

| | | |
|---|---|---|
| 2,170,158 | Rennerfelt | Aug. 22, 1939 |
| 2,282,124 | Fahrenwald | May 5, 1942 |
| 2,541,153 | Chadwick | Feb. 13, 1951 |

FOREIGN PATENTS

| | | |
|---|---|---|
| 539,555 | Great Britain | Sept. 16, 1941 |